(12) United States Patent
Park et al.

(10) Patent No.: US 7,701,823 B2
(45) Date of Patent: Apr. 20, 2010

(54) WRITE-ONCE OPTICAL DISC, AND METHOD AND APPARATUS FOR RECORDING MANAGEMENT INFORMATION ON WRITE-ONCE OPTICAL DISC

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/798,009

(22) Filed: May 9, 2007

(65) Prior Publication Data

US 2007/0211591 A1    Sep. 13, 2007

Related U.S. Application Data

(63) Continuation of application No. 10/670,196, filed on Sep. 26, 2003, now Pat. No. 7,233,550.

(30) Foreign Application Priority Data

Sep. 30, 2002  (KR) .......................... P2002-059341
Feb. 25, 2003  (KR) .......................... P2003-011832

(51) Int. Cl.
G11B 5/09  (2006.01)
(52) U.S. Cl. ................ 369/53.17; 369/53.2; 369/53.15; 369/47.14
(58) Field of Classification Search ............. 369/47.14, 369/53.15
See application file for complete search history.

(56) References Cited

U.S. PATENT DOCUMENTS 4,558,446 A   12/1985  Banba et al.
4,733,386 A   3/1988   Shimoi et al.
4,807,205 A   2/1989   Picard et al.
4,963,866 A   10/1990  Duncan
5,051,849 A   9/1991   Fukushima et al.

(Continued)

FOREIGN PATENT DOCUMENTS

| CN | 1134017 A | 10/1996 |
|----|-----------|---------|
| CN | 1140897 C | 1/1997  |
| CN | 1227950 A | 9/1999  |
| CN | 1246707 A | 3/2000  |
| CN | 1273419 A | 11/2000 |

(Continued)

OTHER PUBLICATIONS

JIS handbook data processing for hardware, Japan, Japanese Standards Association Inc., Apr. 21, 1999, pp. 1064-1070.

(Continued)

*Primary Examiner*—Muhammad N. Edun
(74) *Attorney, Agent, or Firm*—Birch, Stewart, Kolasch & Birch, LLP

(57) ABSTRACT

A recording medium, and a method and apparatus for recording management information on the recording medium are discussed. According to an embodiment, the invention provides a method of recording management information on a recording medium, the recording medium including a temporary defect management area (TDMA) and a final defect management area (DMA), the DMA including a defect list area, the method comprising: recording, in the TDMA, defect list information produced while the recording medium is in use, and recording, in the defect list area of the DMA, the latest defect list information included in the TDMA when the recording medium is to be finalized, wherein the defect list area of the DMA includes a plurality of recording units, and the latest defect list information is recorded on at least one of the recording units of the defect list area.

20 Claims, 11 Drawing Sheets

U.S. PATENT DOCUMENTS

| | | | |
|---|---|---|---|
| 5,065,388 A | 11/1991 | Roth et al. | |
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A * | 8/1993 | Bish et al. | 369/53.17 |
| 5,237,553 A | 8/1993 | Fukushima et al. | |
| 5,247,494 A | 9/1993 | Ohno et al. | |
| 5,289,450 A | 2/1994 | Mizumoto et al. | |
| 5,319,626 A | 6/1994 | Ozaki et al. | |
| 5,343,456 A | 8/1994 | Maeda et al. | |
| 5,404,357 A | 4/1995 | Ito et al. | |
| 5,442,611 A | 8/1995 | Hosaka et al. | |
| 5,448,728 A | 9/1995 | Takano et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,555,537 A | 9/1996 | Imaino et al. | |
| 5,577,194 A | 11/1996 | Wells et al. | |
| 5,608,715 A | 3/1997 | Yokogawa et al. | |
| 5,633,764 A | 5/1997 | Ohta | |
| 5,644,539 A | 7/1997 | Yamagami et al. | |
| 5,715,221 A * | 2/1998 | Ito et al. | 369/47.14 |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,805,547 A | 9/1998 | Yamamuro | |
| 5,825,726 A | 10/1998 | Hwang et al. | |
| 5,848,038 A | 12/1998 | Igarashi et al. | |
| 5,867,455 A | 2/1999 | Miyamoto et al. | |
| 5,878,020 A | 3/1999 | Takahashi | |
| 5,890,206 A | 3/1999 | Koike | |
| 5,914,928 A | 6/1999 | Takahashi et al. | |
| 5,930,815 A | 7/1999 | Estakhri et al. | |
| 5,940,702 A | 8/1999 | Sakao et al. | |
| 5,966,358 A | 10/1999 | Mine | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,182,240 B1 | 1/2001 | Mine | |
| 6,189,118 B1 | 2/2001 | Sasaki et al. | |
| 6,205,099 B1 | 3/2001 | Sasaki et al. | |
| 6,212,647 B1 | 4/2001 | Sims, III et al. | |
| 6,233,654 B1 | 5/2001 | Aoki et al. | |
| 6,249,884 B1 | 6/2001 | Joo | |
| 6,292,445 B1 | 9/2001 | Ito et al. | |
| 6,301,220 B1 | 10/2001 | Takagi et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,418,100 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 * | 5/2003 | Kim et al. | 714/723 |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,243 B2 | 12/2003 | Ando et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 | 9/2004 | Park et al. | |
| 6,795,389 B1 | 9/2004 | Nishiuchi et al. | |
| RE38,638 E | 10/2004 | Yonemitsu et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,845,072 B1 | 1/2005 | Weirauch | |
| 6,883,111 B2 | 4/2005 | Yoshida et al. | |
| 6,918,003 B2 | 7/2005 | Sasaki et al. | |
| 6,922,802 B2 | 7/2005 | Kim et al. | |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 * | 3/2007 | Park et al. | 714/6 |
| 7,233,550 B2 * | 6/2007 | Park et al. | 369/47.14 |
| 7,236,687 B2 | 6/2007 | Kato et al. | |
| 7,272,086 B2 | 9/2007 | Hwang et al. | |
| 7,289,404 B2 * | 10/2007 | Park et al. | 369/53.17 |
| 7,296,178 B2 | 11/2007 | Yoshida et al. | |
| 7,313,066 B2 | 12/2007 | Hwang et al. | |
| 7,317,670 B2 | 1/2008 | Park | |
| 7,327,654 B2 | 2/2008 | Hwang et al. | |
| 7,349,301 B2 | 3/2008 | Terada et al. | |
| 7,355,934 B2 | 4/2008 | Park et al. | |
| 7,372,788 B2 | 5/2008 | Park et al. | |
| 7,372,792 B2 | 5/2008 | Park | |
| 7,379,402 B2 | 5/2008 | Ko et al. | |
| 7,428,670 B2 | 9/2008 | Hwang et al. | |
| 7,483,349 B2 | 1/2009 | Park et al. | |
| 7,483,355 B2 | 1/2009 | Park | |
| 7,506,109 B2 | 3/2009 | Park | |
| 2001/0009537 A1 | 7/2001 | Park | |
| 2001/0011267 A1 | 8/2001 | Kihara et al. | |
| 2001/0014070 A1 | 8/2001 | Ando et al. | |
| 2001/0021144 A1 | 9/2001 | Oshima et al. | |
| 2001/0026511 A1 | 10/2001 | Ueda et al. | |
| 2001/0033517 A1 | 10/2001 | Ando et al. | |
| 2001/0043525 A1 | 11/2001 | Ito et al. | |
| 2001/0043800 A1 | 11/2001 | Gotoh et al. | |
| 2002/0025138 A1 | 2/2002 | Isobe et al. | |
| 2002/0049938 A1 | 4/2002 | Ko | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |

| | | | | | |
|---|---|---|---|---|---|
| 2002/0176341 A1 | 11/2002 | Ko et al. | EP | 0314186 A2 | 5/1989 |
| 2002/0186341 A1 | 12/2002 | Yamamura et al. | EP | 0325823 A1 | 8/1989 |
| 2003/0072236 A1 | 4/2003 | Hirotsune et al. | EP | 0 350 920 A2 | 1/1990 |
| 2003/0095482 A1 | 5/2003 | Hung et al. | EP | 0428208 A2 | 5/1991 |
| 2003/0126527 A1 | 7/2003 | Kim et al. | EP | 0464811 A2 | 1/1992 |
| 2003/0135800 A1 | 7/2003 | Kim et al. | EP | 0472484 A2 | 2/1992 |
| 2003/0137909 A1 | 7/2003 | Ito et al. | EP | 0477503 A2 | 4/1992 |
| 2003/0137910 A1 | 7/2003 | Ueda et al. | EP | 0556046 A1 | 2/1993 |
| 2003/0137913 A1 | 7/2003 | Oshima et al. | EP | 0871172 A2 | 10/1998 |
| 2003/0142608 A1 | 7/2003 | Yamamoto et al. | EP | 0908882 A2 | 4/1999 |
| 2003/0149918 A1 | 8/2003 | Takaichi | EP | 0971345 A1 | 1/2000 |
| 2003/0173669 A1 | 9/2003 | Shau | EP | 0974967 A1 | 1/2000 |
| 2003/0198155 A1 | 10/2003 | Go et al. | EP | 0989554 A1 | 3/2000 |
| 2003/0237024 A1 | 12/2003 | Ogawa et al. | EP | 0997904 A1 | 5/2000 |
| 2004/0001408 A1 | 1/2004 | Propps et al. | EP | 1026681 B1 | 8/2000 |
| 2004/0004917 A1 | 1/2004 | Lee | EP | 1040937 A1 | 10/2000 |
| 2004/0022171 A1 | 2/2004 | Ko | EP | 1043723 A1 | 10/2000 |
| 2004/0062159 A1* | 4/2004 | Park et al. ............... 369/47.14 | EP | 1132914 A2 | 9/2001 |
| 2004/0062160 A1 | 4/2004 | Park et al. | EP | 1143444 | 10/2001 |
| 2004/0090888 A1 | 5/2004 | Park et al. | EP | 1148493 A2 | 10/2001 |
| 2004/0105363 A1 | 6/2004 | Ko et al. | EP | 1152414 A2 | 11/2001 |
| 2004/0114474 A1 | 6/2004 | Park et al. | EP | 1239478 A1 | 9/2002 |
| 2004/0120233 A1 | 6/2004 | Park et al. | EP | 1274081 A2 | 1/2003 |
| 2004/0125716 A1 | 7/2004 | Ko et al. | EP | 1298659 A1 | 4/2003 |
| 2004/0125717 A1 | 7/2004 | Ko et al. | EP | 1321940 A1 | 6/2003 |
| 2004/0136292 A1* | 7/2004 | Park et al. ............... 369/53.17 | EP | 1329888 A1 | 7/2003 |
| 2004/0145980 A1 | 7/2004 | Park et al. | EP | 1347452 A2 | 9/2003 |
| 2004/0158768 A1 | 8/2004 | Park et al. | EP | 1547065 A0 | 6/2005 |
| 2004/0160799 A1 | 8/2004 | Park et al. | EP | 1547066 A1 | 6/2005 |
| 2004/0165495 A1 | 8/2004 | Park et al. | EP | 1552510 A1 | 7/2005 |
| 2004/0174782 A1 | 9/2004 | Lee et al. | EP | 1564740 A1 | 8/2005 |
| 2004/0174785 A1 | 9/2004 | Ueda et al. | EP | 1573723 A0 | 9/2005 |
| 2004/0179445 A1 | 9/2004 | Park et al. | EP | 1576603 A2 | 9/2005 |
| 2004/0179458 A1 | 9/2004 | Hwang et al. | EP | 1597722 A1 | 11/2005 |
| 2004/0193946 A1 | 9/2004 | Park et al. | EP | 1609135 A1 | 12/2005 |
| 2004/0223427 A1 | 11/2004 | Kim et al. | EP | 1612790 A1 | 1/2006 |
| 2004/0246849 A1 | 12/2004 | Hwang et al. | EP | 1623422 A0 | 2/2006 |
| 2004/0246851 A1 | 12/2004 | Hwang et al. | GB | 2356735 A | 5/2001 |
| 2004/0246852 A1 | 12/2004 | Hwang et al. | JP | 63-091842 A | 4/1988 |
| 2005/0007910 A1 | 1/2005 | Ito et al. | JP | 64-079940 | 3/1989 |
| 2005/0008346 A1 | 1/2005 | Noguchi et al. | JP | 1166751 A | 6/1989 |
| 2005/0025007 A1 | 2/2005 | Park | JP | 01-263955 A | 10/1989 |
| 2005/0047294 A1 | 3/2005 | Park | JP | 02-023417 A | 1/1990 |
| 2005/0050402 A1 | 3/2005 | Koda et al. | JP | 2-054327 | 2/1990 |
| 2005/0052972 A1 | 3/2005 | Park | JP | 02-152072 | 6/1990 |
| 2005/0052973 A1 | 3/2005 | Park | JP | 4114371 A | 4/1992 |
| 2005/0055500 A1 | 3/2005 | Park | JP | 4-172662 | 6/1992 |
| 2005/0060489 A1 | 3/2005 | Park | JP | 05-274814 A | 10/1993 |
| 2005/0068877 A1 | 3/2005 | Yeo | JP | 6-309802 A | 11/1994 |
| 2005/0083740 A1 | 4/2005 | Kobayashi | JP | 06-338139 | 12/1994 |
| 2005/0083767 A1 | 4/2005 | Terada et al. | JP | 06-349201 A | 12/1994 |
| 2005/0083830 A1 | 4/2005 | Martens et al. | JP | 07-029177 A | 1/1995 |
| 2005/0111315 A1 | 5/2005 | Hwang et al. | JP | 07-121993 | 5/1995 |
| 2005/0195716 A1 | 9/2005 | Ko et al. | JP | 7-168749 A | 7/1995 |
| 2005/0207262 A1 | 9/2005 | Terada et al. | JP | 8-50766 A | 2/1996 |
| 2005/0289389 A1 | 12/2005 | Yamagami et al. | JP | 08-096522 A | 4/1996 |
| 2006/0077827 A1 | 4/2006 | Takahashi | JP | 08-147702 A | 6/1996 |
| 2006/0195719 A1 | 8/2006 | Ueda et al. | JP | 08-273162 A | 10/1996 |
| 2006/0203635 A1 | 9/2006 | Ko et al. | JP | 8-287595 A | 11/1996 |
| 2006/0203638 A1 | 9/2006 | Ko et al. | JP | 09-145634 A | 6/1997 |
| 2006/0203684 A1 | 9/2006 | Ko et al. | JP | 09-231053 A | 9/1997 |
| 2006/0227694 A1 | 10/2006 | Woerlee et al. | JP | 9-28849 A | 10/1997 |
| 2006/0233078 A1 | 10/2006 | Terada et al. | JP | 09-270175 A | 10/1997 |
| 2007/0294571 A1 | 12/2007 | Park et al. | JP | 09-320204 | 12/1997 |
| 2008/0046780 A1 | 2/2008 | Shibuya et al. | JP | 10-050005 A | 2/1998 |
| | | | JP | 10-050032 A | 2/1998 |
| | FOREIGN PATENT DOCUMENTS | | JP | 10-187356 | 7/1998 |
| | | | JP | 10-187357 | 7/1998 |
| CN | 1342314 A | 3/2002 | JP | 10-187358 | 7/1998 |
| CN | 1479304 | 3/2004 | JP | 10-187359 | 7/1998 |
| CN | 1675708 A | 9/2005 | JP | 10-187360 | 7/1998 |
| CN | 1685426 A | 10/2005 | JP | 10-187361 A1 | 7/1998 |
| DE | 199 54 054 A1 | 6/2000 | JP | 10-199154 A | 7/1998 |

| | | | | | | |
|---|---|---|---|---|---|---|
| JP | 10-261286 | A | 9/1998 | RU | 2005 103 626 | 9/2005 |
| JP | 11-39801 | A | 2/1999 | RU | 2005 127 337 | 2/2006 |
| JP | 11-086418 | A | 3/1999 | RU | 2337416 | C2 10/2008 |
| JP | 11-86436 | A | 3/1999 | TW | 283232 | A 8/1996 |
| JP | 11-110888 | A | 4/1999 | TW | 302475 | A 4/1997 |
| JP | 11-203792 | A | 7/1999 | TW | 371752 | 10/1999 |
| JP | 11-134809 | | 10/1999 | TW | 413805 | 12/2000 |
| JP | 2000-040308 | A | 2/2000 | TW | 495750 | B 7/2002 |
| JP | 2000-090588 | A | 3/2000 | WO | WO-84/00628 A1 | 2/1984 |
| JP | 2000-105980 | A | 4/2000 | WO | WO-96/30902 A1 | 10/1996 |
| JP | 2000-149449 | A | 5/2000 | WO | WO-97/22182 A1 | 6/1997 |
| JP | 2000-195178 | A | 7/2000 | WO | WO-97/36296 A1 | 10/1997 |
| JP | 2000-215612 | | 8/2000 | WO | WO-00/07185 A1 | 2/2000 |
| JP | 2000-285607 | A | 10/2000 | WO | WO-00/54274 A1 | 9/2000 |
| JP | 2000-293948 | | 10/2000 | WO | WO-01/06512 | 1/2001 |
| JP | 2000-322835 | A | 11/2000 | WO | WO-01/22416 A1 | 3/2001 |
| JP | 2000322875 | A | 11/2000 | WO | WO-01/24179 A1 | 4/2001 |
| JP | 2000339874 | A | 12/2000 | WO | WO-01/35408 A1 | 5/2001 |
| JP | 2001-023317 | A | 1/2001 | WO | WO-01/75879 A1 | 10/2001 |
| JP | 2001-069440 | A | 3/2001 | WO | WO-01/93035 A2 | 12/2001 |
| JP | 2001-110168 | A | 4/2001 | WO | WO-01/95330 A2 | 12/2001 |
| JP | 2001-148166 | A | 5/2001 | WO | WO-02/086888 A2 | 10/2002 |
| JP | 2001-167472 | A | 6/2001 | WO | WO-03/007296 A1 | 1/2003 |
| JP | 2001-266464 | A | 9/2001 | WO | WO-03/025924 A1 | 3/2003 |
| JP | 2001-319339 | A | 11/2001 | WO | WO-0300173 A2 | 4/2003 |
| JP | 2001-351314 | A | 12/2001 | WO | WO-03/063165 A1 | 7/2003 |
| JP | 2001-351334 | A | 12/2001 | WO | WO-03/079353 A1 | 9/2003 |
| JP | 2001-357623 | A | 12/2001 | WO | WO-2004/015707 A1 | 2/2004 |
| JP | 2002-015507 | A | 1/2002 | WO | WO-2004/015708 A1 | 2/2004 |
| JP | 2002-015525 | A | 1/2002 | WO | WO-2004/025648 | 3/2004 |
| JP | 2002-050131 | A | 2/2002 | WO | WO-2004/025649 | 3/2004 |
| JP | 2002-056619 | A | 2/2002 | WO | WO-2004/029668 | 4/2004 |
| JP | 2002-109834 | A | 4/2002 | WO | WO-2004/029668 A2 | 4/2004 |
| JP | 2002-157832 | A | 5/2002 | WO | WO-2004/029941 A1 | 4/2004 |
| JP | 2002-170342 | A | 6/2002 | WO | WO-2004/029942 | 4/2004 |
| JP | 2002-215612 | A | 8/2002 | WO | WO-2004/029968 A2 | 4/2004 |
| JP | 2002-245723 | A | 8/2002 | WO | WO-2004/034396 A1 | 4/2004 |
| JP | 2002-288938 | A | 10/2002 | WO | WO-2004/036561 | 4/2004 |
| JP | 2002-329321 | A | 11/2002 | WO | WO-2004/036561 A1 | 4/2004 |
| JP | 2002-352522 | A | 12/2002 | WO | WO-2004/053872 A1 | 6/2004 |
| JP | 2003-030844 | | 1/2003 | WO | WO-2004/053874 A1 | 6/2004 |
| JP | 2003-505813 | | 2/2003 | WO | WO-2004/059648 A2 | 7/2004 |
| JP | 2003151216 | A1 | 5/2003 | WO | WO-2004/068476 A1 | 8/2004 |
| JP | 2003-228962 | A | 8/2003 | WO | WO-2004/075180 | 9/2004 |
| JP | 2003-335062 | A | 11/2003 | WO | WO-2004/077415 A1 | 9/2004 |
| JP | 2003-536194 | A | 12/2003 | WO | WO-2004/079631 | 9/2004 |
| JP | 2004-95057 | A | 3/2004 | WO | WO-2004/079729 A1 | 9/2004 |
| JP | 2004-171714 | | 6/2004 | WO | WO-2004/079731 A1 | 9/2004 |
| JP | 2004-213774 | A | 7/2004 | WO | WO-2004/079740 A1 | 9/2004 |
| JP | 2004-280864 | A | 10/2004 | WO | WO-2004/081922 | 9/2004 |
| JP | 2004-280865 | A | 10/2004 | WO | WO-2004/081926 A1 | 9/2004 |
| JP | 2004-303381 | | 10/2004 | WO | WO-2004/086379 | 10/2004 |
| JP | 2004280866 | | 10/2004 | WO | WO-2004/093035 A1 | 10/2004 |
| JP | 2005004912 | | 1/2005 | WO | WO-2004/100155 A1 | 11/2004 |
| JP | 2005-56542 | A | 3/2005 | WO | WO-2004/100156 A1 | 11/2004 |
| JP | 2005-004912 | A | 6/2005 | WO | WO-2005/004123 A1 | 1/2005 |
| JP | 2005-535993 | A | 11/2005 | WO | WO-2005/004154 A2 | 1/2005 |
| JP | 2005-538490 | A | 12/2005 | WO | WO-2005/024792 A2 | 3/2005 |
| JP | 2005-538491 | A | 12/2005 | WO | WO-2005/062306 | 7/2005 |
| JP | 2006-500724 | | 1/2006 | WO | WO-2005/073971 | 8/2005 |
| JP | 2006-503396 | | 1/2006 | | | |
| JP | 2006-519445 | A | 8/2006 | | | |
| JP | 2006518533 | T | 8/2006 | | | |
| JP | 2007-501488 | A | 1/2007 | | | |
| JP | 2008-112577 | A | 5/2008 | | | |
| KR | 1020040094301 | A | 11/2004 | | | |
| RU | 2174716 | C2 | 10/1999 | | | |
| RU | 2192673 | C2 | 11/2002 | | | |
| RU | 2208844 | C2 | 7/2003 | | | |
| RU | 2223556 | | 2/2004 | | | |

OTHER PUBLICATIONS

ECMA "ECMA 238 Data interchange on 130mm"(1996) XP-002289010.

English Abstract for RU-2006-127439-A, Feb. 10, 2008.

Yokozeki et al., "A Virtual Optical Disk Method to Realize Rewritability and Revision Control on a Write-Once Optical Disk", Systems and Computers in Japan, vol. 21, No. 8, (1990) XP000177819.

* cited by examiner

Single Layer BD-WO

FIG. 7

| DMA fill-in timing | contents | Location in DMA |
|---|---|---|
| No more record (50a) | Latest TDDS & TDFL | DDS & DFL |
| TDMA Full (50b) | Latest TDDS & TDFL | DDS & DFL |
| User selection (50c) | Latest TDDS & TDFL | DDS & DFL |

50a, 50b, 50c grouped as Finalization.

FIG. 8

| DMA fill-in timing | contents | Location in DMA |
|---|---|---|
| Non D.M (50d) | Predetermined Value (ex, zero padding) | DFL |
| No more record (50a) | Latest TDDS | DDS |
| TDMA Full (50b) | Latest TDDS | DDS |
| User selection (50c) | Latest TDDS | DDS |

50a, 50b, 50c grouped as Finalization.

- D.M : Defect Management
- DMA : Defect Management Area

FIG. 9A

| DMA fill-in timing | contents | Location in DMA |
|---|---|---|
| 50e — No more record But Spare & TDMA left | Latest TDDS & TDFL | Part of DMA |
| 50b — TDMA Full (Finalization) | Latest TDDS & TDFL | Remainder of DMA |
| 50c — User selection | Latest TDDS & TDFL | Remainder of DMA |

- D.M : Defect Management
- DMA : Defect Management Area

FIG. 9B

| Clusters 1 ~ 2 | DDS (before Finalization) |
|---|---|
| Clusters 3 ~ 4 | DDS (at Finalization) |
| Clusters 5 ~ 8 | DFL (before Finalization) |
| Clusters 9 ~ 12 | 1st position of DFL (at Finalization) |
| ⋮ | ⋮ |
| Clusters 29 ~ 32 | 6th position of DFL (at Finalization) |

FIG. 10

| (T)DDS status flag (1byte) in DMA/TDMA | |
|---|---|
| 0000 0000 | In DMA, after User select finalization |
| 0000 1111 | In DMA, after no more record |
| 1111 0000 | In DMA, after TDMA Full |
| 1111 1111 | In TDMA, before finalization |

WRITE-ONCE OPTICAL DISC, AND METHOD AND APPARATUS FOR RECORDING MANAGEMENT INFORMATION ON WRITE-ONCE OPTICAL DISC

This application is a Continuation of U.S. patent application Ser. No. 10/670,196 filed on Sep. 26, 2003, now U.S. Pat. No. 7,233,550 which is incorporated by reference. This application claims the priority benefit of the Korean Application Nos. P2002-059341 filed on Sep. 30, 2002 and P2003-011832 filed on Feb. 25, 2003, the entire contents of which are hereby fully incorporated by reference.

BACKGROUND OF THE INVENTION

1. Field of the Invention

The present invention relates to a writable-once optical disc and a management information recording method and apparatus, and more particularly, to a method and apparatus for efficiently recording management information on a writable-once optical disc.

2. Discussion of the Background Art

Optical disc, which is a kind of optical recording media and can record a large amount of data, is widely being used. Today, a kind of innovative high-density digital versatile disc (HD-DVD) such as a blue ray disc (Blu-ray Disc), which can record and store video data of high quality and audio data of high fidelity for a long time, is under development.

The Blu-ray disc is a next generation optical recording solution that can store a larger amount of data than a conventional DVD. The Blu-ray disc employs a blue-violet laser with the wavelength of 405 nm which is shorter than the wavelength of 650 nm of a red laser used to access a conventional DVD. The Blu-ray disc has generally a thickness of 1.2 mm and a diameter of 12 cm. It includes a light transmission layer whose thickness is 0.1 mm so that the Blu-ray disc can store a larger amount of data than the current DVDs.

Various standards related to the Blu-ray discs are in development. Among the different types of Blu-ray discs, a Blu-ray Disc Rewritable (BD-RE) and a Blu-ray Disc Write-Once (BD-WO) are being developed.

FIG. 1 schematically illustrates a structure of a recording area of a general BD-RE. Referring to FIG. 1, the BD-RE includes a recording layer divided into a lead-in area, a data area and a lead-out area. The data area includes a user data area for recording user data thereon, and an inner spare area ISA0 and an outer spare area OSA0 each allocated in the inner tracks and the outer tracks of the disc. These spare areas are used as replacement areas for replacing data in a defective area of the user data area according to linear replacement.

In the BD-RE, if a defective area is found in the user data area during recording, data in the defective area is transferred to and recorded on a spare area. Further, as defect management information for managing the defective area, position information and the like relating to the defective area and the corresponding spare area are recorded on defect management areas (DMA 1~DMA 4) in the lead-in area and the lead-out area. Also, since data can be recorded on and erased from any area of the BD-RE repeatedly (since the BD-RE is rewritable), the entire BD-RE can be randomly used irrespective of a specific recording mode.

In contrast, in a writable-once Blu-ray disc (BD-WO), data can be recorded only one time on a specific area of the disc. As a result, the BD-WO has certain limitations pertaining to recording modes and in randomly using the entire area of the disc due to the defect management difficulty.

Further, in a BD-WO, management of the defective areas is one of the important matters that needs to be addressed, especially for data recording operations. But since the BD-WO is still in the early development stage, there are no schemes, no disc structures, no apparatuses, and no methods on how to manage the defective areas of the BD-WO and record management information on the BD-WO, which will be needed for the BD-WO to be commercially viable and operationally feasible. Accordingly, for the BD-WO, a unified specification is required that would satisfy the aforementioned advanced requirements. But any proposed specification relating to the current BD-RE cannot be used because it does not address the needs of the BD-WO.

SUMMARY OF THE INVENTION

Accordingly, the present invention is directed to a recording medium and a management information recording method and apparatus that substantially obviate one or more problems due to limitations and disadvantages of the background art.

An object of the present invention is to provide a method of recording disc management information such as timing, contents and location information in a plurality of management areas of a write-once optical disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording management information on a write-once optical recording medium, the recording medium including a temporary defect management area (TDMA) and a final defect management area (DMA), includes: recording, in the TDMA, management information produced while the recording medium is in use; and transferring and recording the latest management information of the TDMA in the DMA at a DMA fill-in stage of the recording medium.

In accordance with an aspect of the invention, a method of recording management information on a write-once optical recording medium, the recording medium including a temporary defect management area (TDMA) and a final defect management area (DMA), the DMA including a defect list area for storing therein defect list information, includes: if no defect management is to be performed on the recoding medium, setting a predetermined value in the defect list area of the DMA; recording, in the TDMA, management information produced while the recording medium is in use; and transferring and recording the latest management information of the TDMA in the DMA when the recording medium is to be finalized.

In accordance with another aspect of the invention, an apparatus for recording management information on a write-once optical recording medium, the recording medium including a temporary defect management area (TDMA) and a final defect management area (DMA), includes a combination of elements configured for: recording, in the TDMA, management information produced while the recording medium is in use; and transferring and recording the latest management information of the TDMA in the DMA at a DMA fill-in stage of the recording medium.

In accordance with another aspect of the invention, an apparatus for recording management information on a write-once optical recording medium, the recording medium including a temporary defect management area (TDMA) and a final defect management area (DMA), the DMA including a defect list area for storing therein defect list information, includes a combination of elements configured for: setting a predetermined value in the defect list area of the DMA if no defect management is to be performed on the recoding medium; recording, in the TDMA, management information produced while the recording medium is in use; and transferring and recording the latest management information of the TDMA in the DMA when the recording medium is to be finalized.

In accordance with another aspect of the invention, a write-once optical recording medium for recording management information thereon, includes: at least one recording layer including a temporary defect management area (TDMA) and a final defect management area (DMA), wherein management information produced while the recording medium is in use is recorded in the TDMA, and the latest management information of the TDMA is transferred and recorded in the DMA at a DMA fill-in stage of the recording medium.

In accordance with another aspect of the invention, a write-once optical recording medium for recording management information thereon, includes: at least one recording layer including a temporary defect management area (TDMA) and a final defect management area (DMA), the DMA including a defect list area for storing therein defect list information, wherein if no defect management is to be performed on the recoding medium, a predetermined value is set in the defect list area of the DMA; management information produced while the recording medium is in use is recorded in the TDMA; and the latest management information of the TDMA is transferred and recorded in the DMA when the recording medium is to be finalized.

In accordance with another aspect, the present invention provides a method of recording management information on a recording medium, the recording medium including a temporary defect management area (TDMA) and a final defect management area (DMA), the DMA including a defect list area, the method comprising: recording, in the TDMA, defect list information produced while the recording medium is in use; and recording, in the defect list area of the DMA, the latest defect list information included in the TDMA when the recording medium is to be finalized, wherein the defect list area of the DMA includes a plurality of recording units, and the latest defect list information is recorded on at least one of the recording units of the defect list area.

In accordance with another aspect, the present invention provides an apparatus for recording management information on a recording medium, the recording medium including a temporary defect management area (TDMA) and a final defect management area (DMA), the DMA including a defect list area, the apparatus comprising: a unit for recording, in the TDMA, defect list information produced while the recording medium is in use; and a unit for recording, in the defect list area of the DMA, the latest defect list information included in the TDMA when the recording medium is to be finalized, wherein the defect list area of the DMA includes a plurality of recording units, and the latest defect list information is recorded on at least one of the recording units of the defect list area.

In accordance with another aspect, the present invention provides a recording medium for storing information, the recording medium comprising: a temporary defect management area (TDMA) for storing defect list information, while the recording medium is in use; and a final defect management area (DMA) for storing the latest defect list information included in the TDMA when the recording medium is to be finalized, wherein the DMA includes a defect list area having a plurality of recording units, and the latest defect list information is recorded on at least one of the recording units of the defect list area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 shows a chart for explaining the timing, contents and location information associated with the DMA fill-in process of a BD-WO according to a first embodiment of the present invention;

FIG. 8 shows a chart for explaining the timing, contents and location information associated with the DMA fill-in process of a BD-WO according to a second embodiment of the present invention;

FIG. 9A shows a chart for explaining the timing, contents and location information associated with the DMA fill-in process of a BD-WO according to a third embodiment of the present invention;

FIG. 9B shows an example of the DMA to which the DMA fill-in process of FIG. 9A is applied; and FIG. 10 shows examples of values of a TDDS/DDS status flag recorded as part of the DDS information in the DDS section of the DMA according to the present invention.

DETAILED DESCRIPTION OF THE PREFERRED EMBODIMENTS

Figure 1:
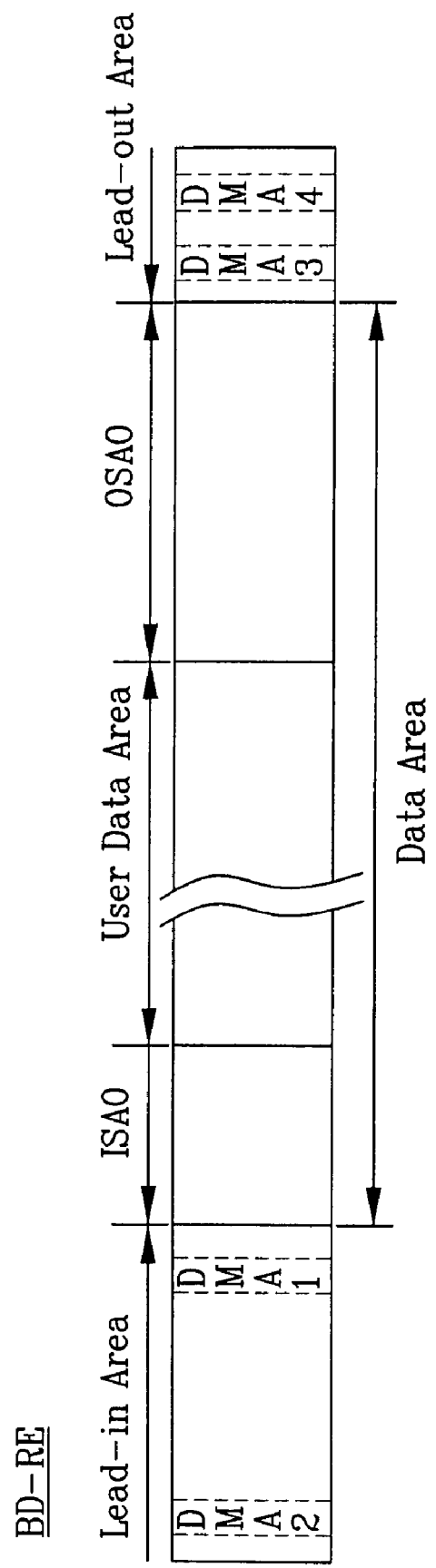
FIG. 1 schematically illustrates a structure of a general single-layer BD-RE.

Reference will now be made in detail to the preferred embodiments of the present invention, examples of which are illustrated in the accompanying drawings. Wherever possible, the same reference numerals will be used throughout the drawings to refer to the same or like parts.

Figure 2:
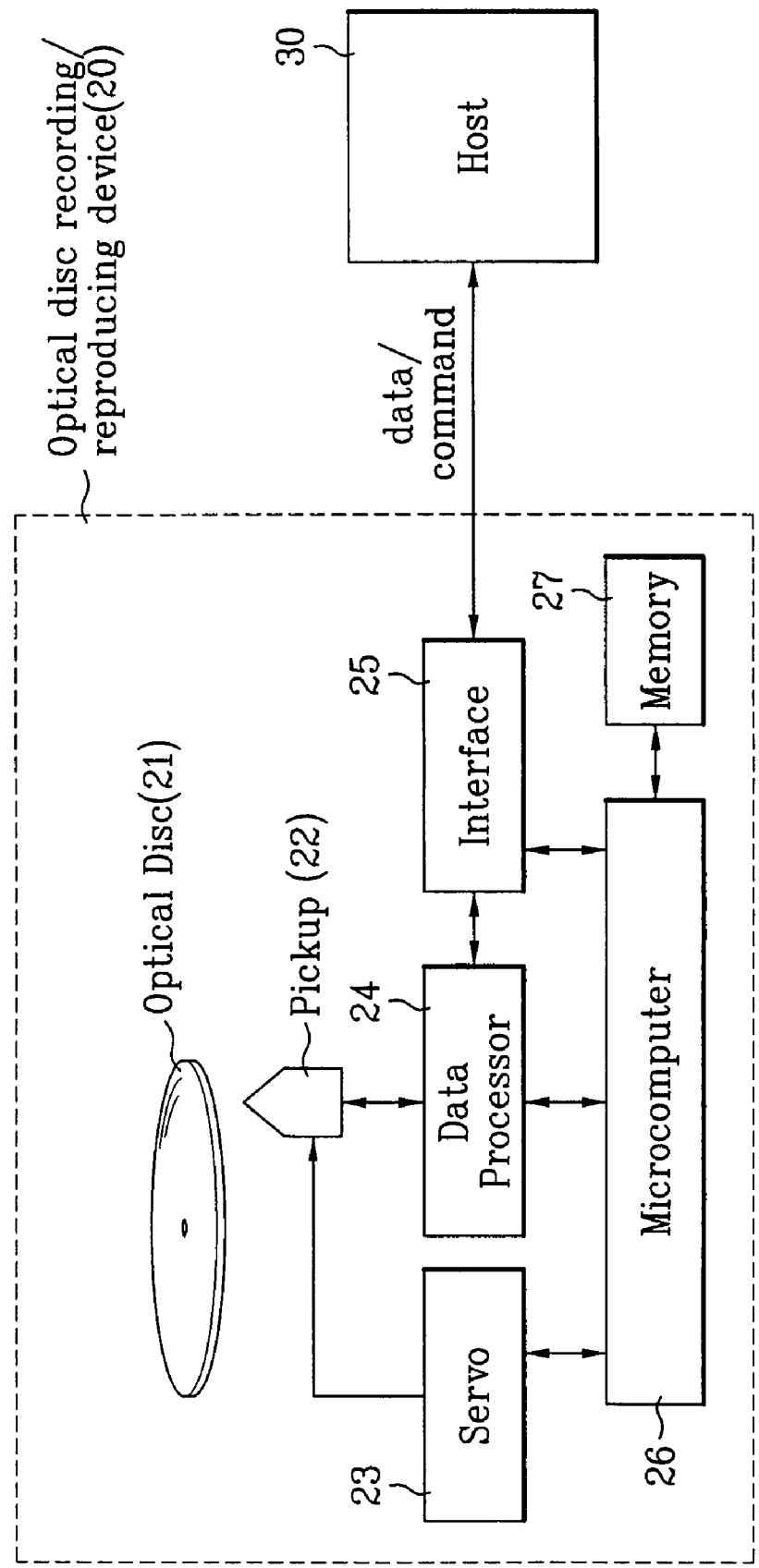
FIG. 2 is a block diagram of an optical recording/reproducing device according the present invention.

FIG. 2 is an example of a block diagram of an optical disc recording/reproducing device 20 according to an embodiment of the present invention. The optical disc recording/reproducing device 20 includes an optical pickup 22 for writing/reading data to/from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data as needed (e.g., temporary defect management information, etc.) associated with the recording medium 21, and a microprocessor or controller 26 for controlling the operations and elements of the recording/reproducing device 20. Data to be written/read to/from the recording medium 21 may also be stored in the memory 27 if needed. All the components of the recording/reproducing device 20 are operatively coupled. The recording medium 21 is a recording medium of write-once type such as a BD-WO.

All the methods and disc structures discussed herein according to the present invention can be implemented using the recording/reproducing device 20 of FIG. 2 or any other suitable device/system. For example, the microcomputer 26 of the device 20 may be used to control allocation of the disc structure and to control the recording of management information on the recording medium and the transferring of the management information from a temporary area (e.g., TDMA) to a permanent or final area (e.g., DMA) on the recording medium 21. The TDMA and DMA will be discussed later in more detail.

A management information recording method for a writable-once optical disc such as a BD-WO according to the preferred embodiments of the present invention will be now described in detail with reference to the accompanying drawings. For a discussion convenience, a writable-once Blu-ray disc (BD-WO) will be exemplified. Herein, two types of a BD-WO—a single layer BD-WO and a dual layer BD-WO—are discussed. The single layer BD-WO has a single recording layer, whereas the dual layer BD-WO has two recording layers.

Figure 3:
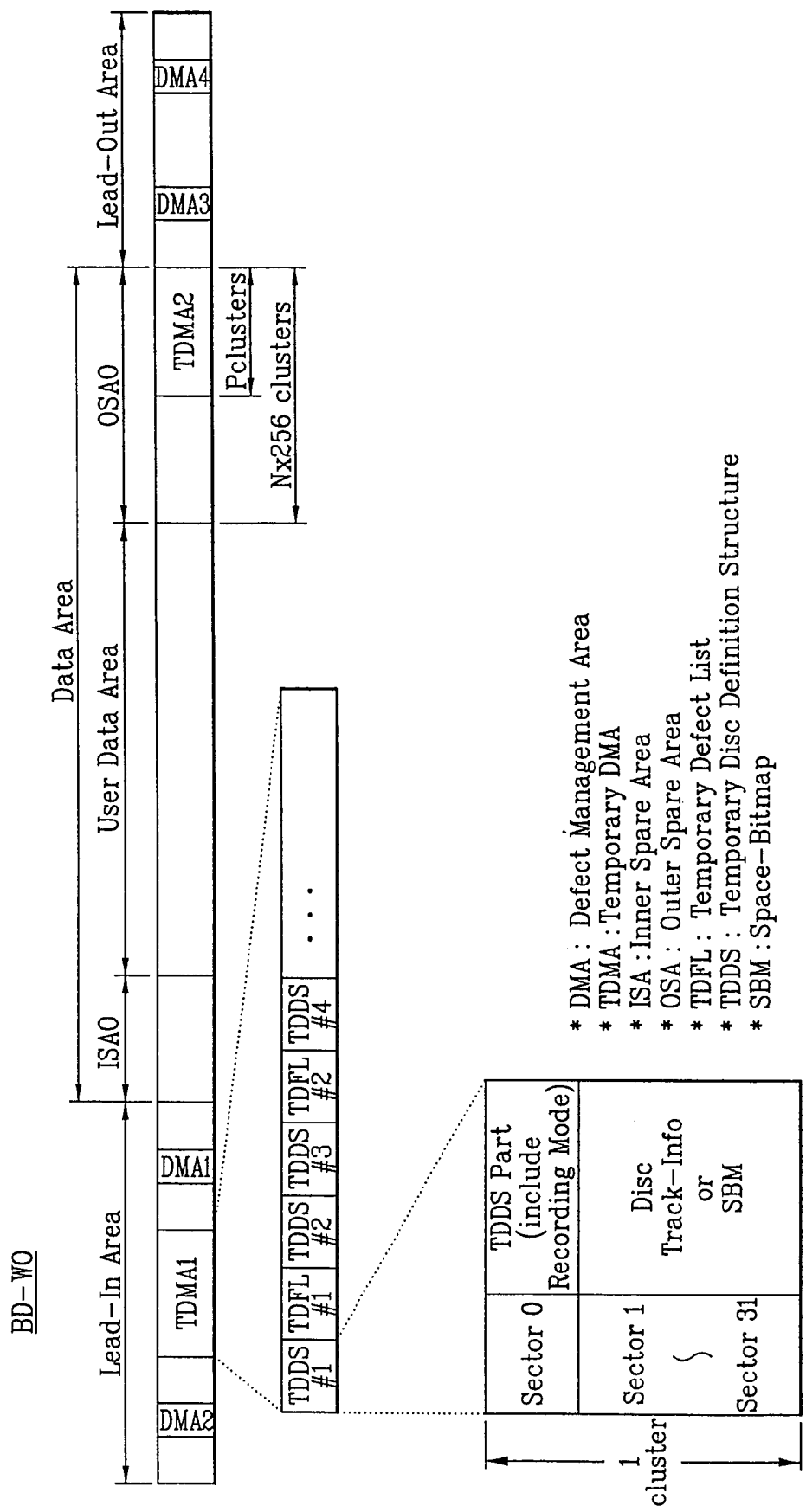
FIG. 3 illustrates a structure of a writable-once optical disc such as a single layer BD-WO according to an embodiment of the present invention.

FIG. 3 illustrates a structure of a writable-once optical recording medium such as a single-layer BD-WO according to an embodiment of the present invention. Referring to FIG. 3, the BD-WO includes a lead-in area, a data area, and a lead-out area allocated on the single recording layer. Each of the lead-in area and the lead-out area includes a plurality of defect management areas (DMA 1 and DMA 2; DMA 3 and DMA 4) for storing therein DMA information for defect management. Each of the DMAs 1-4 has a fixed size, e.g., 32 clusters. Generally, in view of the importance of defect management, the same information is written in each of the DMAs 1-4 so that if one of the DMAs is defective, then a different DMA can be accessed to obtain the defect management information.

It should be noted that in a general BD-RE, since data can be repeatedly recorded on and erased from a DMA (although the size of the DMA is limited), a DMA of large size is not required. However, in a BD-WO according to the present invention, since data cannot be repeatedly recorded on and erased from the DMA, a DMA of large size is required for defect management.

Still referring to FIG. 3, the lead-in area further includes a temporary defect management area (TDMA 1) for temporarily storing defect management information therein. The data area includes an inner spare area ISA0, a user data area, and an outer spare area OSA0. Parts of or the entire ISA0 and OSA0 are used as replacement areas for defective areas in the user data area according to linear replacement. For instance, during a recording of data into the user data area, if a defective area in the user data area is detected, then the data written or to be written to this defective area is transferred to a spare area (e.g., ISA0 or OSA0) according to a linear replacement scheme. The outer spare area OSA0 includes a temporary defect management area (TDMA 2). The defect management information temporarily stored in the TDMA 1 and/or TDMA 2 is also referred to herein as TDMA information.

In one embodiment, the TDMA 1 allocated to the lead-in area has a fixed size, whereas the TDMA 2 allocated to the outer spare area OSA0 has a variable size depending upon the size of the spare area(s). For example, if the OSA0 has a size of N×256 clusters where N>0 (N=integer), then the TDMA 2 has a size of P clusters where P=(N×256)/4.

In one example, the same information may be written in each of the TDMAs 1 and 2. In another example, the TDMAs 1 and 2 may be sequentially used to sequentially record the TDMA information. Regardless, during replacement writing operations for writing data of a defective area onto a spare area, TDMA information is generated (e.g., under control of the microcomputer 26) and written onto the TDMAs 1 and/or 2. The TDMAs are also updated periodically or as needed. When the BD-WO is ready to be finalized or the DMA is to be filled in for other reasons, then the TDMA information (latest version) temporarily written in the TDMA(s) is transferred and written onto one or each of the DMAs 1-4. This transfer process will be discussed later in more detail.

The TDMA information written in each of the TDMAs 1 and 2 includes temporary defect list (TDFL) information and temporary disc definition structure (TDDS) information. In one embodiment, the TDFL information includes one or a plurality of TDFLs (TDFL #1~TDFL #n). Each TDFL includes one or a plurality of defect entries identifying defects and corresponding replacement areas on the disc. Each defect entry includes location information pertaining to a defective area of the user data area and the corresponding replacement area. For example, during a data recording operation on the BD-WO, if a defective area is found in the user data area, then data written or to be written in that defective area is written in a part (replacement area) of a spare area (e.g., ISA0 or OSA0) according to a linear replacement scheme. Then the information pertaining to the defective area and the replacement area and their relationship is entered as a defect entry in the TDFL. For instance, this information may include a first physical sector number of the defective area on the disc, a first physical sector number of the replacement area (spare area) corresponding to that defective area, and any other data pertaining to the defect for defect management.

In one embodiment, the TDDS information written in each of the TDMAs 1 and 2 includes one or a plurality of TDDSs (TDDS #1~TDDS #n). Each TDDS has a fixed size (e.g., one cluster) and includes location information pertaining to the TDFL(s) so that the location of any TDFL can be quickly identified by accessing the TDDS(s). This location information can be written in a portion of Sector 0 of the one cluster, and may include one or more physical sector numbers each indicating a location of a TDFL written on the BD-WO, and any other information pertaining to the TDFL information. Here, a cluster has 32 sectors each sector having 2048 bytes.

Each TDDS also includes recording mode information (RM). The recording mode information identifies a recording mode of the BD-WO and can be written in a portion of Sector 0 of the one cluster. The location information pertaining to the TDFL(s) and the recording mode information discussed above are referred to herein as a TDDS part. Here, the TDDS part occupies the entire Sector 0 of the cluster (or any other designated location area).

Each TDDS also includes disc usage management information which identifies the status of a recording area of the BD-WO and which can be represented in one of the two forms: track information (Track-Info) and space bitmap information (SBM). This structure of the TDDS will be discussed in more detail later by referring to FIG. 4.

As the data recording operation for writing data into the data area progresses, the TDMAs may be updated periodically to reflect any recently discovered defective areas and corresponding replacement areas. After each updating of the TDMA, a TDFL and a corresponding TDDS, which may include all previous TDMA information and the recently generated TDMA information, may be written in the TDMA. In this aspect, the latest TDDS and TDFL written in the TDMA of the BD-WO would include the latest TDMA information. Then when the BD-WO is to be finalized or the DMA(s) is ready to be filled in, the latest TDDS and TDFL written on the BD-WO are transferred and written in one or each of the DMAs 1-4 as the final and most-updated defect management information.

Figure 4:
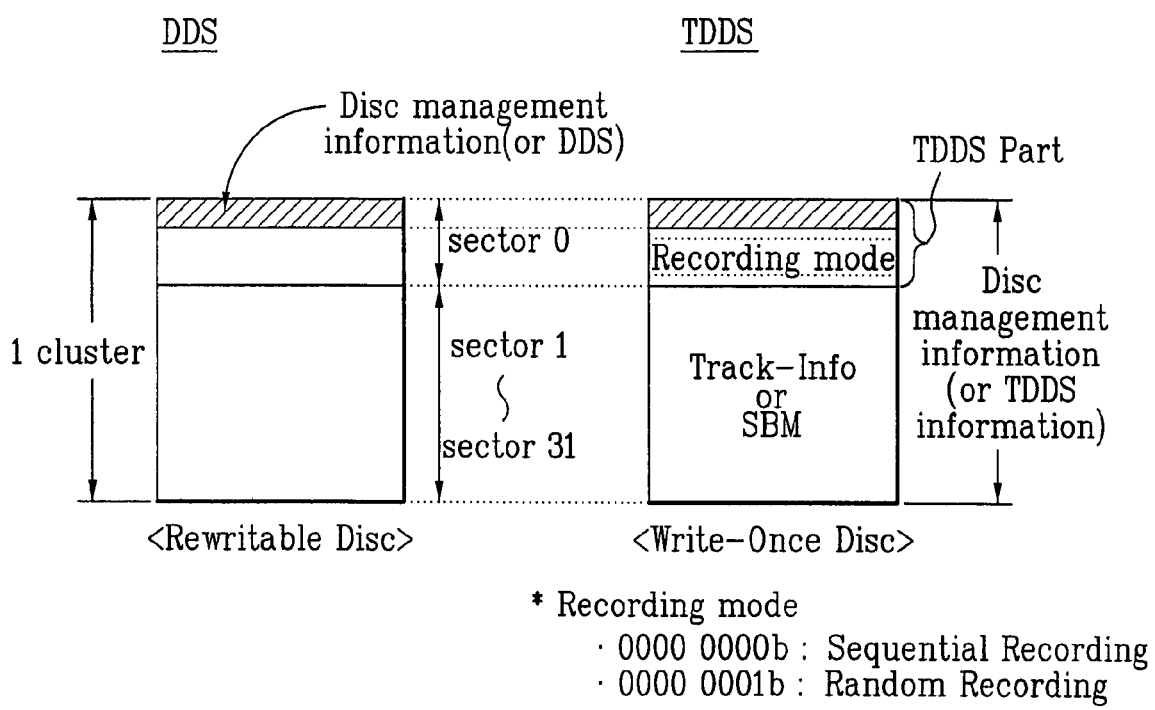
FIG. 4 illustrates an example of a DDS structure on a rewritable disc, a TDDS structure on a BD-WO and a disc management information recording method for the BD-WO according to an embodiment of the present invention.

FIG. 4 illustrates a DDS structure of a rewritable disc, an example of a TDDS structure on a BD-WO and a disc management information recording method for the BD-WO according to an embodiment of the present invention. As shown in FIG. 4, in the DDS of a general rewritable optical disc, only 60 byte information corresponding to an extremely small portion of 1 cluster is used to store therein the DDS information. The entire remaining part of the DDS is all set to 'zero padding'.

In contrast, in the BD-WO, the entire TDDS area is used to store therein the TDDS information. As shown in FIGS. 3 and 4, the TDDS part (including the location information and the recording mode information) is written in the entire Sector 0 of the cluster assigned as the TDDS, whereas Sectors 1-31 store therein the disc usage management information (Track-Info or SBM). In another example, the disc usage management information can be recorded on the first 31 sectors (Sectors 0~30) in the TDDS, and any remaining disc usage management information can be recorded on the last $32^{nd}$ sector (Sector 31) in the TDDS along with the TDDS part.

The recording mode information identifies one of a plurality of recording modes employed in the BD-WO according to the present invention. In this example, a value of "0000 0000" may be used to indicate a sequential recoding mode, and a value of "0000 0001" may be used to indicate a random recording mode. Obviously, other examples are possible. Information about the BD-WO according to the present invention can be variously determined depending upon the needs through a process of specification regulation.

The disc usage management information is varied in dependence upon the disc usage. In the BD-WO, the disc usage management information is required for accurately searching and detecting the start point of an available recording area, and is used to distinguish a recording area from a non-recording area on the disc. In this aspect, the disc usage management information indicates where the available recording area and the recorded area are located within the data area (e.g., user data area).

As mentioned above, the disc usage management information can be represented as either the track information (Track-Info) or the space bitmap information (SBM). The Track-Info is generally used when the BD-WO is recorded in a sequential recording mode. The SBM is generally used when the BD-WO is recorded in a random recording mode. These recording modes can be determined depending on the recording mode identified in the recording mode information stored in the TDDS.

In conventional writable-once optical discs, the recording status/mode information is expressed as 'track information' in case of compact disc series, and as 'Rzone', 'Fragment' or 'recording range' in case of DVD series. But in the present invention, the aforementioned various expressions relating to the recording status/mode information are commonly designated as 'Track-Info', and accordingly the Track-Info will be appreciated as having such meaning irrespective of expressions.

In one example, since the tracks on the BD-WO are sequentially used to record during the sequential recording mode, the Track-Info identifies the start point (location) of the recording area (e.g., user data area) of the BD-WO, and the end point (location) of the last recorded portion of the recording area. This information then indicates the start of the next available portion of the recording area on the BD-WO.

The bitmap information identifies a start point of an available recordable portion of the recording area on the BD-WO using bit values such as '0' and '1'. For instance, if a particular cluster area of the recording area on the BD-WO has been recorded, then it is indicated by allocating a value of '1' to every minimal recording unit (1 cluster). If a cluster area of the recording area has no recorded data thereon, then that cluster is assigned to a value of '0'. In this manner, if the SBM indicates that a particular cluster has a value of '1' assigned thereto, then it indicates that that cluster has been already used (i.e., it has recorded data thereon). If the SBM indicates that a particular cluster has a value of '0', then it indicates that that cluster has not been used yet (i.e., it has no recorded data thereon). Obviously, the reversal or some other values may be used to indicate the recording/non-recording state of each area unit such as the clusters of the user data area. Thus, the SBM makes it possible to express a recording usage status of the disc even in the random recording mode.

Figure 5:
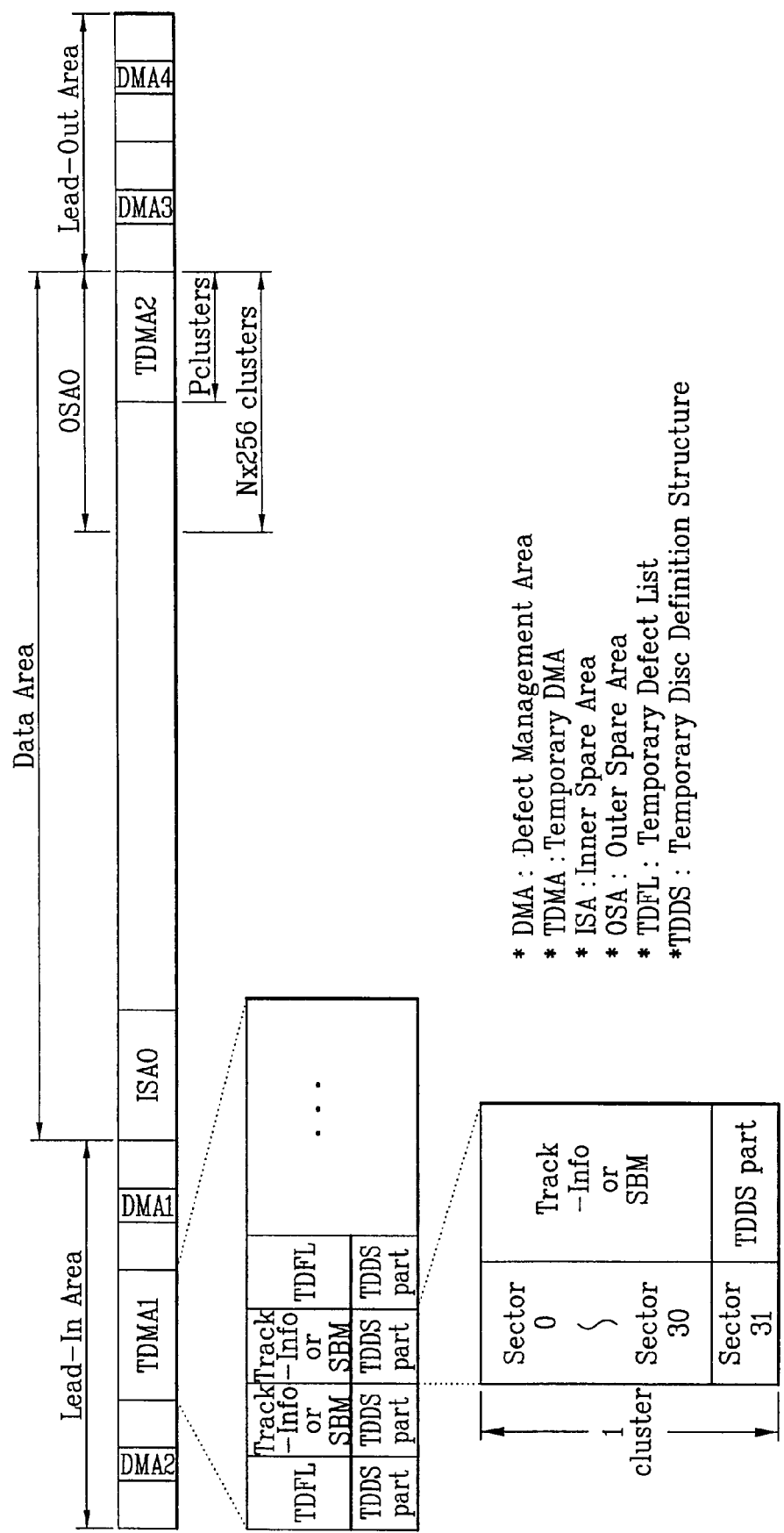
FIG. 5 illustrates a structure of a writable-once optical disc such as a single layer BD-WO according to another embodiment of the present invention.

FIG. 5 illustrates a structure of a writable-once optical disc such as a single layer BD-WO according to another embodiment of the present invention. The BD-WO structure of FIG. 5 is identical to the BD-WO structure of FIG. 3, except that the TDDS part, which includes the location information of the TDFL(s) and the recording mode information, is updated and written after each update state as shown in FIG. 5. In this aspect, the disc usage management information (Track-Info or SBM) is stored in Sectors 0-30 of one cluster of the TDMA, and the TDDS part and RM are stored in Sector 31 of the one cluster. The TDDS part occupies the entire Sector 31 of the cluster. In another example, the TDDS part may be stored in the entire Sector 0 of one cluster of the TDMA, and the Track-Info or SBM may be stored in Sectors 1-31 of the one cluster.

Now, the method of transferring the TDMA information from the TDMA to the DMA according to the embodiments of the present invention will be explained by referring to FIGS. 6A-10. This transfer process is also called a DMA fill-in process.

Figure 6A:
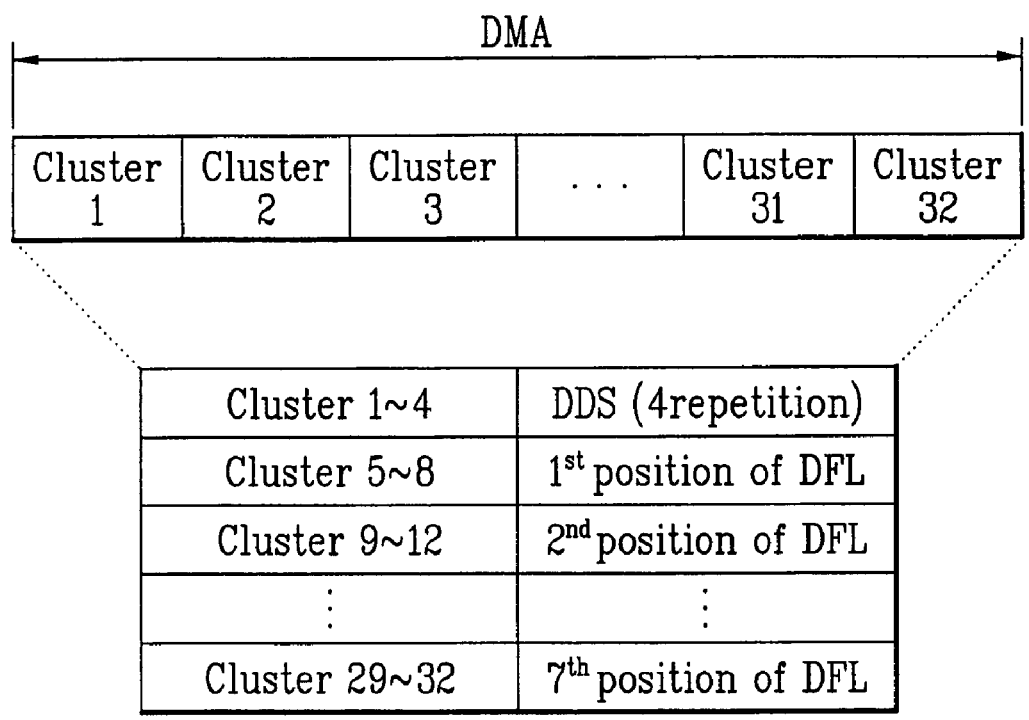
FIG. 6A shows an exemplary structure of a DMA of a single-layer BD-WO according to an embodiment of the present invention.
Figure 6B:
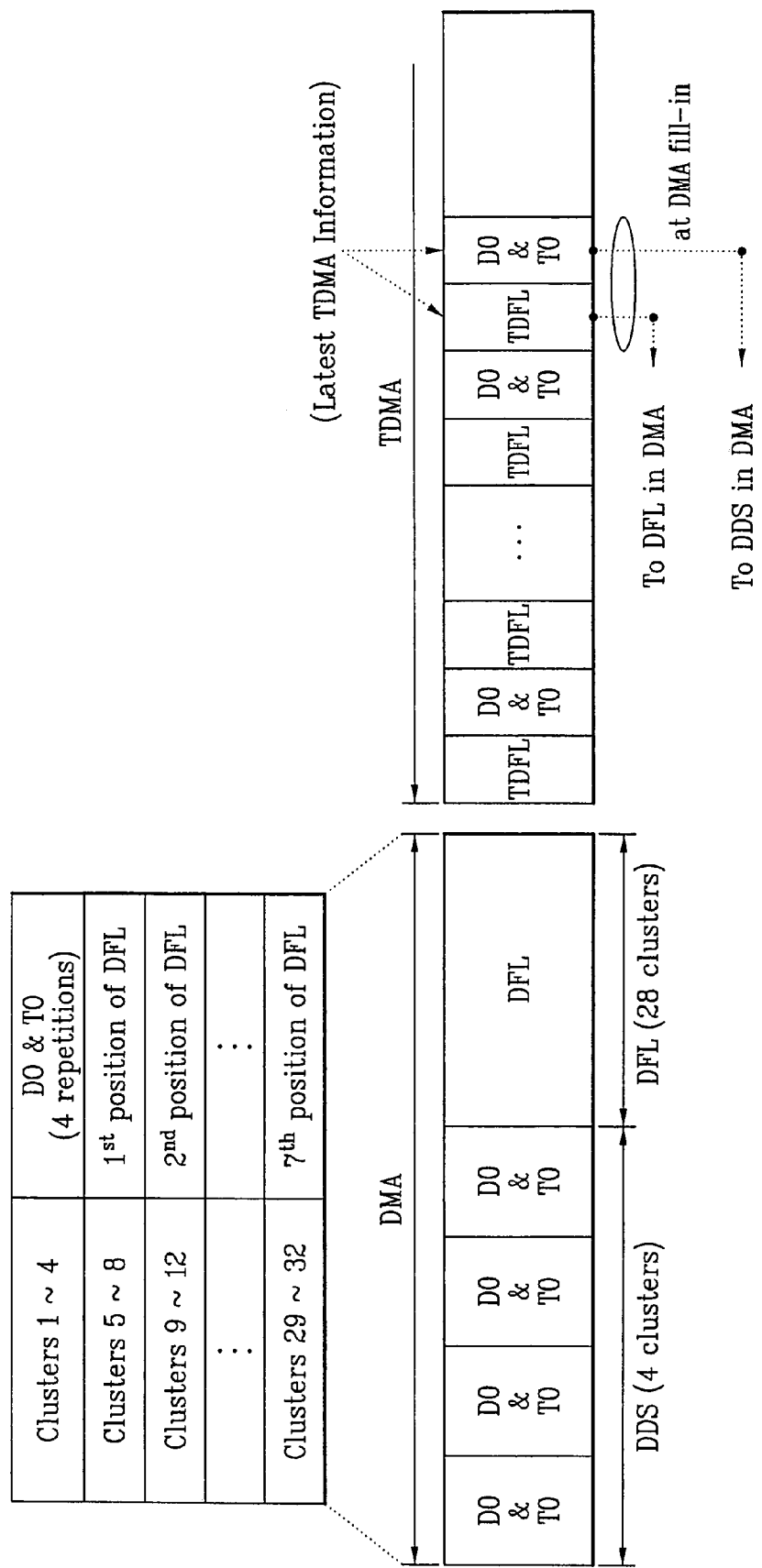
FIG. 6B illustrates the structure of the DMA of FIG. 6A, a TDMA structure and a method of transferring data from the TDMA to the DMA according to an embodiment of the present invention.

FIG. 6A shows an exemplary structure of a DMA of a single-layer BD-WO, and FIG. 6B illustrates the structure of the DMA of FIG. 6A, a TDMA structure and a method of transferring data from the TDMA to the DMA according to an embodiment of the present invention. The DMA shown in FIGS. 6A and 6B equals one or each of the DMAs 1-4 shown in FIG. 3.

Referring to FIGS. 6A and 6B, the DMA is composed of 32 clusters. The Clusters 1-4 of the DMA are designated as a DDS section, whereas the Clusters 5-32 of the DMA are designated as a DFL section. All the clusters of the DMA in the BD-WO are designated for storing management data.

During the DMA fill-in process, the latest TDDS information from the TDMA is transferred to and recorded in each of Cluster 1 to Cluster 4 of the DMA as DDS information. That is, the latest TDDS part (T0) (including the TDFL location information and the recording mode information) and the latest disc usage management information (Track-Info or SBM) (D0) of the TDDS information are transferred onto the DMA. As a result, the same DDS information is four times recorded in the DMA. The latest TDFL information from the TDMA is also transferred to and recorded in Clusters 5-32 of the DMA as DFL information. Here, the same DFL information can be recorded in the DMA up to seven times by designating four clusters of the DMA for recording the DFL information therein. In one example, the TDDS part written in the DDS section of the DMA may identify the location of the DFLs in the DMA on the BD-WO, and not necessarily the location of the TDFLs in the TDMA on the BD-WO. Storing the same information repeatedly in the DDS section or the DFL section ensures that the DMA information is not lost (e.g., due to a defect in a portion of the DMA) and is accurately and completely accessed each time it is needed.

Figure 6C:
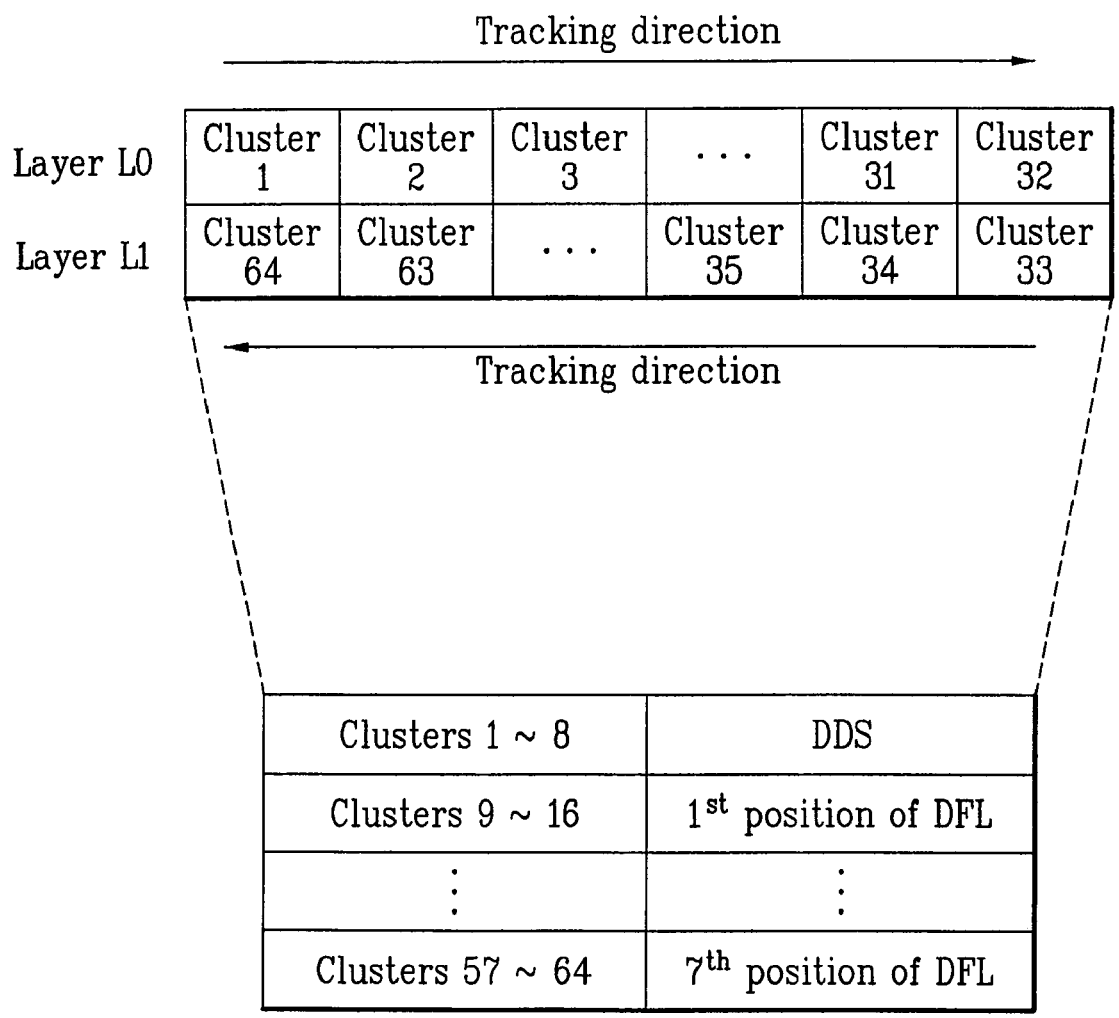
FIG. 6C shows an exemplary structure of a DMA of a dual-layer BD-WO according to an embodiment of the present invention.

FIG. 6C shows an exemplary structure of a DMA of a dual-layer BD-WO according to an embodiment of the present invention. Referring to FIG. 6C, one DMA of the dual-layer BD-WO is composed of a DMA part (Clusters 1-32) from a first recording layer L0 of the BD-WO, and a DMA part (Clusters 33-64) from a second recording layer (L1) of the BD-WO, which are accessed according to the tracking direction indicated with the arrow. The same DDS information (e.g., for both recording layers) is repeatedly recorded on the Clusters 1~8 of the DMA, and the same DFL information is repeatedly recorded on the Clusters 9~64 of the DMA, up to the maximum of, e.g., seven times. In addition, the BD-WO includes a lead-in area, a data area and an outer zone area on the first recording layer, and a lead-out area, a data area and an outer zone area on the second recording layer. Each of the data areas may include at least one spare area and a user data area. The lead-in area of the first recording layer may include a TDMA and first and second DMAs. The lead-out area of the second recording layer may include another TDMA and first and second DMAs. Here, as an example, one DMA shown in FIG. 6C may be composed of the first DMAs from the first and second recording layers, or of the second DMAs from the first and second recording layers. Additional DMAs may also be provided in the outer zone areas. The spare area(s) may include additional TDMA(s).

Similar to the single layer BD-WO, the TDMAs in the lead-in/lead-out area of the dual layer BD-WO may have a fixed size, whereas the TDMAs in the spare areas may have a variable size depending upon the size of the spare area(s). The use and structure of the DMAs and TDMAs on the single layer BD-WO as discussed herein applies equally to the DMAs and TDMAs on the dual layer BD-WO.

In one embodiment, the latest disc usage management information is recorded each on the front part of a first DMA in the lead-in area and/or on the front/rear part of a DMA in the lead-out area (depending on whether the disc has a single or multiple recording layers). This allows the disc usage management information to be accessed quickly at the initial loading time of the disc. Further, the data reliability and data preservation can be assured by repetitive recording of same information in different parts of the disc.

FIG. 7 shows a chart for explaining the timing, contents and location information associated with the DMA fill-in process of a BD-WO according to a first embodiment of the present invention. This DMA fill-in process is applicable to the BD-WO structures shown in FIGS. 3 and 5-6C, or other suitable BD-WO structures.

Referring to FIG. 7, the time for transferring the TDMA information into the DMA of the BD-WO is when the BD-WO is to be finalized. Defect management is performed on the BD-WO. As a result, the TDMA information produced while the BD-WO is in use is recorded in the TDMA, and when the BD-WO is to be finalized, the latest TDMA information from the TDMA is transferred to and recorded in the DMA.

The time for finalization is generally divided into three cases. The first case (50*a*) is when no more recording is performed on the BD-WO (e.g., data recording in the user data area is completed, or no user data area remains on the disc). The second case (50*b*) is when the TDMA is full of data and no further TDMA information can be recorded therein. As one example only, this case may occur if the entire TDMA(s) for recording the TDMA information have been used. The third case (50*c*) is when the user requests a finalization of the BD-WO. As one example only, the user or host may request the finalization of the BD-WO even though some user data area or the TDMA is not full, or even though the user data recording in the user data area is not completed.

In all three cases of timing, the contents transferred from the TDMA to the DMA are the latest TDDS information (the latest TDDS part and the latest disc usage management information) and the latest TDFL information written in the TDMA of the BD-WO. The latest TDDS information and the latest TDFL information written in the TDMA are transferred to a DDS section and a DFL section of the DMA, respectively, during the DMA fill-in process.

FIG. 8 shows a chart for explaining the timing, contents and location information associated with the DMA fill-in process of a BD-WO according to a second embodiment of the present invention. This DMA fill-in process is applicable to the BD-WO structures shown in FIGS. 3 and 5-6C or other suitable BD-WO structures.

The second embodiment addresses a scenario when the defect management (DM) on the BD-WO is not to be performed. Whether or not the DM is to be performed on the BD-WO can be determined during the initialization of the BD-WO or some other time based on known factors such as a user or host command not to perform defect management, etc. Referring to FIG. 8, if it is determined that the DM is not be performed (50*d*) on the BD-WO (e.g., when the disc is initialized), then a specified value, sign or other indication is set in a DFL section of the DMA. This indication indicates that no DM is performed on the BD-WO (e.g., no defect lists are recorded on the BD-WO or no linear replacement schemes are performed to transfer the data of a defective user area to a replacement/spare area). When no DM is to be performed, A/V (audio/video) data can be recorded in real time. Here, since no DM is performed during the disc recording (e.g., into the user data area), no TDFLs are generated and the predetermined value or some other fixed indication can be set in the DFL section of the DMA. In one example, the predetermined value for indicating no DM is set in the DFL section of the DMA in advance before the finalization of the BD-WO (e.g., at the disc initialization). At this time, the entire DFL section of the DMA may be padded with the zero value. In another variation, a predetermined value (e.g., zero) or some other indication may be set in the TDFL area of the TDMA, and then this value (TDFL information) may be transferred to the DFL section of the DMA while the TDDS information is transferred to the DDS section of the DMA during the DMA-fill in process (i.e., at the finalization of the BD-WO).

The process of transferring the TDDS information from the TDDS of the TDMA to the DDS section of the DMA in the second embodiment is identical to that of the first embodiment of FIG. 7. More specifically, after it is determined that no DM is to be performed on the BD-WO and then when the BD-WO is ready to be finalized, then the latest TDDS information is transferred to the DDS section of the DMA. As shown in FIG. 8, during the finalization of the BD-WO, in the first case (50a) when no more recording is performed on the BD-WO, in the second case (50b) when the TDMA is full, and in the third case when the user requests finalization of the BD-WO, the latest TDDS information from the TDMA is transferred and recorded in the DDS section of the DMA as part of DMA fill-in process.

For example, if the DMA fill-in process of FIG. 8 is applied to the DMA structure of FIG. 6A, the Clusters 1-4 of the DMA would store therein the predetermined value (e.g., zero), and the latest TDDS information (e.g., the latest TDDS part and the latest disc usage management information) from the TDMA is transferred and recorded in the DDS section of the DMA. AS discussed above, the same latest TDDS information can be recorded up to seven times in the Cluster 5-32 of the DMA. That is, in the maximum 7 repetition recording, the same latest TDDS information is written in the Clusters 5-8, the Cluster 9-12, the Cluster 13-16, . . . and the Clusters 29-32 of the DMA.

FIG. 9A shows a chart for explaining the timing, contents and location information associated with the DMA fill-in process of a BD-WO according to a third embodiment of the present invention. This DMA fill-in process is applicable to the BD-WO structures shown in FIGS. 3 and 5-6C or other suitable BD-WO structures.

The third embodiment addresses a scenario when no more data can be recorded in the user data area of the BD-WO, but the spare area(s) and the TDMA(s) are not full and can still be used to perform defect management. If any recordable area remains in the spare area (e.g., ISA0 and OSA0) and the TDMA (e.g., TDMAs 1 and 2) even though no more recordable area exists in the user data area of the BD-WO (e.g., because the user data area is full, etc.), then at that time, the latest TDDS information (e.g., the latest TDDS part and the latest disc usage management information) and the latest TDFL information from the TDMA are transferred and recorded into an area of the DMA. Subsequently, when the BD-WO is ready to be finalized, the latest TDDS information and the latest TDFL information at that time from the TDMA are transferred and recorded into another area of the DMA, such as the remaining area of the DMA.

Referring to FIG. 9A, in this embodiment, the DM is performed even during the reproduction of the BD-WO. Particularly, if the spare area and the TDMA are not full and are available for use in the DM even though the recordable user data area is not available (50e), the latest TDMA information of the TDMA at this time is transferred and recorded in only a partial area of the DMA before the finalization of the BD-WO. Subsequently, when the BD-WO is to be finalized (50b or 50c), the latest TDMA information of the TDMA at that time is then transferred and recorded in the remaining or another area designated of the DMA.

Here, the time for finalization is divided into two cases 50b and 50c, which are identical to the two cases 50b and 50c in FIG. 7. Briefly, the first case (50b) is when the TDMA is full of data and no further TDMA information can be recorded therein. The second case (50c) is when the user requests a finalization of the BD-WO.

FIG. 9B shows an example of the DMA to which the DMA fill-in process of FIG. 9A is applied. As shown in FIG. 9B, when the situation 50e occurs, the latest TDDS information is written as DDS information into two clusters (e.g., Clusters 1 and 2) of the DMA, and the latest TDFL information is written as DFL information into four clusters (e.g., Clusters 5-8) of the DMA. Here the latest TDFL information is written once in Clusters 5-8 without any repetition. Then when the disc is to be finalized (50b or 50c), the latest TDDS information of that time is written as DDS information into two clusters (e.g., Clusters 3 and 4) of the DMA and the latest TDFL information of that time is written as DFL information into the remaining clusters of the DMA. For instance, the same TDFL information can be written up to six times in the Clusters 9-32 of the DMA. Other variations are possible.

FIG. 10 shows examples of values of a TDDS/DDS status flag recorded as part of the DDS information in the DDS section of the DMA according to the present invention. Such status flag can be used in all the disc structures and methods discussed herein according to the different embodiments of the present invention. This status flag informs the user, host or other entity under which status/case the TDDS or DDS information has been recorded on the BD-WO. The TDDS or DDS status flag may be of one-byte size or some other size.

For instance, in each of the above-discussed first to third embodiments of the present invention, the DDS information written in the DDS section of the DMA may include a DDS status flag. Similarly, the TDDS information written in the TDMA may include a TDDS status flag. One status flag having different values may be used to indicate different recording statuses of the TDDS and DDS information. In the alternative, separate TDDS status flag and DDS status flag can be used.

Referring to FIG. 10, if the same status flag is used for both the TDDS and DDS information, then the status flag of '0000 0000' may mean that the BD-WO is finalized in response to the user's request (50c) and that the management information (e.g., DDS information) is recorded in the DMA. The status flag of '0000 1111' may mean that the BD-WO is finalized because no more recording is allowed in the user data area (50a) and that the management information (e.g., DDS information) is recorded in the DMA. The status flag of '1111 0000' may mean that the BD-WO is finalized because the TDMA is full (50b) and that the management information (e.g., DDS information) is recorded in the DMA. The status flag of '1111 1111' may mean that the management information (e.g., TDDS information) is recorded in the TDMA while the disc is in use. Obviously other variations or status flag values are possible.

Using the status flag discussed above, the status of the BD-WO can be determined or confirmed. For instance, when the disc is loaded for reproduction, the TDDS/DDS status flag value can be examined to determine under what circumstances and in what manner the DMA fill-in process occurred on the disc. Thus, the efficient use of the disc can be assured.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of recording management information on a recording medium, the recording medium including a temporary defect management area (TDMA) and a final defect management area (DMA), the DMA including a defect list area, the method comprising:
   recording, in the TDMA, defect list information produced while the recording medium is in use; and
   recording, in the defect list area of the DMA, the latest defect list information included in the TDMA when the recording medium is to be finalized,
   wherein the defect list area of the DMA is divided into a plurality of recording portions, each recording portion includes a plurality of recording units, and the latest defect list information is recorded on the at least one recording portion of the plurality of recording portions of the defect list area, and
   wherein if the recording medium includes one recording layer, the number of recording portions is seven and each recording portion includes four recording units, and said recording step records the latest defect list information up to seven times on each recording portion when the recording medium is to be finalized.

2. The method of claim 1, wherein the DMA further includes a disc definition structure area, and the method further comprising;
   recording in the TDMA disc definition structure information produced while the recording medium is in use; and
   recording, in the disc definition structure area of the DMA, the latest disc definition structure information included in the TDMA when the recording medium is to be finalized,
   wherein the disc definition structure area of the DMA includes a plurality of recording units, and the latest disc definition structure information is recorded on the at least one recording unit of the disc definition structure area.

3. An apparatus of recording management information on recording medium, the recording medium including a temporary defect management area (TDMA) and a final defect management area (DMA), the DMA including a defect list area, the apparatus comprising:
   a recording device configured to record, in the TDMA, defect list information produced while the recording medium is in use; the recording device configured to further record, in the defect list area of the DMA, the latest defect list information included in the TDMA when the recording medium is to be finalized,
   wherein the defect list area of the DMA is divided into a plurality of recording portions, each recording portion includes a plurality of recording units, and said recording device record the latest defect list information on the at least one recording portion of the plurality of recording portions of the defect list area, and
   wherein if the recording medium includes one recording layer, the number of recording portions is seven and each recording portion includes four recording units, and said recording device records the latest defect list information up to seven times on each recording portion when the recording medium is to be finalized.

4. The apparatus of claim 3, wherein the DMA further includes a disc definition structure area, and the apparatus further comprising;
   the recording device configured to further record, in the TDMA, disc definition structure information produced while the recording medium is in use and the recording device configured to further record, in the disc definition structure area of the DMA, the latest disc definition structure information included in the TDMA when the recording medium is to be finalized,
   wherein the disc definition structure area of the DMA includes a plurality of recording units, and said recording device record the latest disc definition structure information on the at least one recording unit of the disc definition structure area.

5. A recording medium for storing information, the recording medium comprising;
   a single recording layer including;
      a temporary defect management area (TDMA) for storing defect list information, while the recording medium is in use; and
      a final defect management area (DMA) for storing the latest defect list information included in the TDMA when the recording medium is to be finalized,
   wherein the DMA is divided into a plurality of recording portions, each recording portion includes a plurality of recording units, and the latest defect list information is recorded on the at least one recording portion of the plurality of recording portions of the defect list area, and
   wherein the number of recording portions is seven and each recording portion includes four recording units, and said latest defect list information is recorded up to seven times on each recording portion when the recording medium is to be finalized.

6. The recording medium of claim 5, wherein the DMA further includes a disc definition structure area having a plurality of recording units, and
   the temporary defect management area (TDMA) for storing disc definition structure information, while the recording medium is in use; and
   the final defect management area (DMA) for storing the latest disc definition structure information included in the TDMA when the recording medium is to be finalized,
   wherein the latest disc definition structure information is recorded on the at least one recording unit of the disc definition structure area.

7. A method of reproducing data from a recording medium, the recording medium including a temporary defect management area (TDMA) and a final defect management area (DMA), the DMA including a defect list area, the method comprising:
   reading defect list information from at least one recording portion of the defect list area of the DMA if the recording medium is a finalized recording medium; and,
   reproducing data recorded on the recording medium using the defect list information of the DMA,
   wherein the defect list area of the DMA is divided into a plurality of recording portions, each recording portion includes a plurality of recording units, and the defect list information is recorded on the at least one recording portion of the plurality of recording portions, and
   wherein if the recording medium includes one recording layer, the number of recording portions is seven and each recording portion includes four recording units, and said defect list information has been recorded up to seven times on each recording portion when the recording medium is finalized.

8. The method of claim 7, wherein the DMA further includes a disc definition structure area, and the method further comprising;
reading disc definition structure information from the disc definition structure area of the DMA if the recording medium is finalized recording medium,
wherein the disc definition structure area of the DMA includes a plurality of recording units, and the disc definition structure information is recorded on the at least one recording unit of the disc definition structure area.

9. An apparatus of reproducing data from a recording medium, the recording medium including a temporary defect management area (TDMA) and a final defect management area (DMA), the DMA including a defect list area, the apparatus comprising:
a reproducing device configured to read, defect list information from at least one recording portion of the defect list area of the DMA if the recording medium is a finalized recording medium, and the reproducing device further configured to reproduce data recorded on the recording medium using the defect list information of the DMA,
wherein the defect list area of the DMA is divided into a plurality of recording portions, each recording portion includes a plurality of recording units, and the defect list information is recorded on the at least one recording portion of the plurality of recording portions, and
wherein if the recording medium includes one recording layer, the number of recording portions is seven and each recording portion includes four recording units, and said defect list information has been recorded up to seven times on each recording portion when the recording medium is finalized.

10. The apparatus of claim 9, wherein the DMA further includes a disc definition structure area, and the apparatus further comprising;
the reproducing device further configured to read disc definition structure information from the disc definition structure area of the DMA if the recording medium is finalized recording medium,
wherein the disc definition structure area of the DMA includes a plurality of recording units, and the disc definition structure information is recorded on the at least one recording unit of the disc definition structure area.

11. A method of recording management information on a recording medium, the recording medium including a temporary defect management area (TDMA) and a final defect management area (DMA), the DMA including a defect list area, the method comprising:
recording, in the TDMA, defect list information produced while the recording medium is in use; and
recording, in the defect list area of the DMA, the latest defect list information included in the TDMA when the recording medium is to be finalized,
wherein the defect list area of the DMA is divided into a plurality of recording portions, each recording portion includes a plurality of recording units, and the latest defect list information is recorded on the at least one recording portion of the plurality of recording portions of the defect list area, and
wherein if the recording medium includes two recording layers, the number of recording portions is seven and each recording portion includes eight recording units, and said recording step records the latest defect list information up to seven times on each recording portion when the recording medium is to be finalized.

12. The method of claim 11, wherein the DMA further includes a disc definition structure area, and the method further comprising;
recording in the TDMA disc definition structure information produced while the recording medium is in use; and
recording, in the disc definition structure area of the DMA, the latest disc definition structure information included in the TDMA when the recording medium is to be finalized,
wherein the disc definition structure area of the DMA includes a plurality of recording units, and the latest disc definition structure information is recorded on the at least one recording unit of the disc definition structure area.

13. An apparatus of recording management information on recording medium, the recording medium including a temporary defect management area (TDMA) and a final defect management area (DMA), the DMA including a defect list area, the apparatus comprising:
a recording device configured to record, in the TDMA, defect list information produced while the recording medium is in use; the recording device configured to further record, in the defect list area of the DMA, the latest defect list information included in the TDMA when the recording medium is to be finalized,
wherein the defect list area of the DMA is divided into a plurality of recording portions, each recording portion includes a plurality of recording units, and said recording device record the latest defect list information on the at least one recording portion of the plurality of recording portions of the defect list area, and
wherein if the recording medium includes two recording layers, the number of recording portions is seven and each recording portion includes eight recording units, and said recording device records the latest defect list information up to seven times on each recording portion when the recording medium is to be finalized.

14. The apparatus of claim 13, wherein the DMA further includes a disc definition structure area, and the apparatus further comprising;
the recording device configured to further record, in the TDMA, disc definition structure information produced while the recording medium is in use and the recording device configured to further record, in the disc definition structure area of the DMA, the latest disc definition structure information included in the TDMA when the recording medium is to be finalized,
wherein the disc definition structure area of the DMA includes a plurality of recording units, and said recording device record the latest disc definition structure information on the at least one recording unit of the disc definition structure area.

15. A recording medium for storing information, the recording medium comprising;
two recording layers including;
a temporary defect management area (TDMA) for storing defect list information, while the recording medium is in use; and
a final defect management area (DMA) for storing the latest defect list information included in the TDMA when the recording medium is to be finalized,
wherein the DMA is divided into a plurality of recording portions, each recording portion includes a plurality of recording units, and the latest defect list information is recorded on the at least one recording portion of the plurality of recording portions of the defect list area, and wherein the number of recording portions is seven and each recording portion includes eight recording units, and said latest defect list information is recorded up to seven times on each recording portion when the recording medium is to be finalized.

16. The recording medium of claim 15, wherein the DMA further includes a disc definition structure area having a plurality of recording units, and the temporary defect management area (TDMA) for storing disc definition structure information, while the recording medium is in use; and the final defect management area (DMA) for storing the latest disc definition structure information included in the TDMA when the recording medium is to be finalized, wherein the latest disc definition structure information is recorded on the at least one recording unit of the disc definition structure area.

17. A method of reproducing data from a recording medium, the recording medium including a temporary defect management area (TDMA) and a final defect management area (DMA), the DMA including a defect list area, the method comprising:

reading defect list information from at least one recording portion of the defect list area of the DMA if the recording medium is a finalized recording medium; and, reproducing data recorded on the recording medium using the defect list information of the DMA, wherein the defect list area of the DMA is divided into a plurality of recording portions, each recording portion includes a plurality of recording units, and the defect list information is recorded on the at least one recording portion of the plurality of recording portions, and wherein if The recording medium includes two recording layers, the number of recording portions is seven and each recording portion includes eight recording units, and said defect list information has been recorded up to seven times on each recording portion when the recording medium is finalized.

18. The method of claim 17, wherein the DMA further includes a disc definition structure area, and the method further comprising;

reading disc definition structure information from the disc definition structure area of the DMA if the recording medium is finalized recording medium, wherein the disc definition structure area of the DMA includes a plurality of recording units, and the disc definition structure information is recorded on the at least one recording unit of the disc definition structure area.

19. An apparatus of reproducing data from a recording medium, the recording medium including a temporary defect management area (TDMA) and a final defect management area (DMA), the DMA including a defect list area, the apparatus comprising:

a reproducing device configured to read, defect list information from at least one recording portion of the defect list area of the DMA if the recording medium is a finalized recording medium, and the reproducing device further configured to reproduce data recorded on the recording medium using the defect list information of the DMA, wherein the defect list area of the DMA is divided into a plurality of recording portions, each recording portion includes a plurality of recording units, and the defect list information is recorded on the at least one recording portion of the plurality of recording portions, and wherein if the recording medium includes two recording layers, the number of recording portions is seven and each recording portion includes eight recording units, and said defect list information has been recorded up to seven times on each recording portion when the recording medium is finalized.

20. The apparatus of claim 19, wherein the DMA further includes a disc definition structure area, and the apparatus further comprising;

the reproducing device further configured to read disc definition structure information from the disc definition structure area of the DMA if the recording medium is finalized recording medium, wherein the disc definition structure area of the DMA includes a plurality of recording units, and the disc definition structure information is recorded on the at least one recording unit of the disc definition structure area.

* * * * *